(12) United States Patent
Saito et al.

(10) Patent No.: US 8,534,585 B2
(45) Date of Patent: Sep. 17, 2013

(54) CENTRIFUGAL BRAKE DEVICE FOR DUAL-BEARING REEL

(75) Inventors: Kei Saito, Osaka (JP); Akira Niitsuma, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 13/411,026

(22) Filed: Mar. 2, 2012

(65) Prior Publication Data

US 2012/0248233 A1  Oct. 4, 2012

(30) Foreign Application Priority Data

Mar. 29, 2011  (JP) .................................. 2011-072719

(51) Int. Cl.
*A01K 89/01*  (2006.01)

(52) U.S. Cl.
USPC .................. 242/289; 242/301; 188/181 A

(58) Field of Classification Search
USPC .................. 242/289, 301, 304; 188/181 A
See application file for complete search history.

(56) References Cited

U.S. PATENT DOCUMENTS

| 2,055,358 | A | * | 9/1936 | Maynes | 242/289 |
| 4,195,721 | A | * | 4/1980 | Shea | 192/105 CD |
| 4,390,140 | A | * | 6/1983 | Karlsson et al. | 242/289 |
| 5,865,387 | A | * | 2/1999 | Hirano | 242/289 |
| 5,996,921 | A | * | 12/1999 | Hogaki et al. | 242/289 |
| 6,126,105 | A | * | 10/2000 | Yamaguchi | 242/288 |
| 6,196,485 | B1 | * | 3/2001 | Sato | 242/289 |
| 6,254,021 | B1 | * | 7/2001 | Morimoto et al. | 242/289 |
| 6,371,396 | B1 | * | 4/2002 | Kawasaki | 242/289 |
| 6,394,381 | B1 | * | 5/2002 | Hirayama | 242/289 |
| 6,481,657 | B1 | * | 11/2002 | Oishi et al. | 242/289 |
| 6,959,886 | B1 | | 11/2005 | Rho | |

FOREIGN PATENT DOCUMENTS

| JP | 10-304799 | 11/1998 |
| JP | 11-075643 | 3/1999 |
| WO | WO-2006-115351 A1 | 11/2006 |

OTHER PUBLICATIONS

Extended European Search Report of the corresponding European Application No. 12160099.3, dated Oct. 1, 2012.

* cited by examiner

*Primary Examiner* — Emmanuel M Marcelo
(74) *Attorney, Agent, or Firm* — Global IP Counselors, LLP

(57) ABSTRACT

A centrifugal brake device for a dual-bearing reel is provided. The centrifugal brake device is configured to brake a spool. The centrifugal brake device includes a rotation member, a first brake shoe and a brake drum. The rotation member is configured to be rotated at least in conjunction with rotation of the spool in a fishing-line releasing direction. The first brake shoe includes first and second ends, where the first brake shoe is pivotably attached to the rotation member about an axis arranged in parallel to a rotation shaft of the spool, and the axis is arranged between the first end and a center of gravity of the first brake shoe. The brake drum is disposed inwards of the first brake shoe in a radial direction. The brake drum has different diameters and includes an outer peripheral surface being configured to contact with the first end.

9 Claims, 10 Drawing Sheets

| DRUM DIAMETER(D) | CENTRIFUGAL FORCE RATIO | ANGLE A1 (DEGREES) | ANGLE A2 (DEGREES) | ARM RATIO (L1/L2) | BRAKE FORCE RATIO |
|---|---|---|---|---|---|
| 15.7 | 1 | 54.095 | 23.895 | 0.987 | 2.572 |
| 15.3 | 1.028 | 44.429 | 28.390 | 0.918 | 2.027 |
| 14.9 | 1.053 | 35.547 | 33.266 | 0.861 | 1.482 |
| 14.5 | 1.077 | 26.781 | 37.297 | 0.812 | 1 |

FIG. 10

CENTRIFUGAL BRAKE DEVICE FOR DUAL-BEARING REEL

CROSS-REFERENCE TO RELATED APPLICATIONS

This application claims priority to Japanese Patent Application No. 2011-072719 filed on Mar. 29, 2011. The entire disclosure of Japanese Patent Application No. 2011-072719 filed on Mar. 29, 2011 is hereby incorporated herein by reference.

BACKGROUND OF THE INVENTION

1. Field of the Invention

The present invention relates to a brake device, particularly to a centrifugal brake device for a dual-bearing reel, which is configured to brake a spool rotatably attached to a reel unit by means of centrifugal force.

2. Background Art

In the dual-bearing reels used for casting in fishing, brake force is generally applied to a spool for preventing backlash caused when the rotation speed of the spool becomes faster than the releasing speed of a fishing line in casting. It is widely known that some of the spool brake devices for applying brake force to the spool include a centrifugal brake device configured to brake the spool by means of centrifugal force produced by spool rotation.

For example, the centrifugal brake device of the type includes a rotation member, a plurality of moving members, and a brake member. The rotation member is configured to be rotated in conjunction with the spool. The moving members are attached to the rotation member while being movable in a radial direction. The brake member is non-rotatably disposed in a reel unit. The brake member is disposed on the outer peripheral side of the moving members. The brake member is non-rotatably attached to either a side plate on a handle attached side or a side plate on an opposite side to the handle attached side. In the centrifugal brake device, centrifugal force acts on each moving member attached onto a guide shaft in response to spool rotation. Each moving member is herein outwardly moved in the radial direction of the spool shaft, and makes contact with the brake member. The spool is thus braked.

For example, Japan Patent Application Publication Nos. 11-075643 and 10-304799 describe well-known centrifugal brake devices configured to regulate brake force.

In the centrifugal brake device described in the Japanese Patent Application Publication No. 11-075643, a brake member includes a tapered surface with a diameter increased towards a plurality of moving members, and the position of the brake member in a spool shaft direction can be regulated by an operating member. A rotation member includes a plurality of guide shafts radially aligned, and each guide shaft extends perpendicularly to the tapered surface of the brake member. Each moving member is attached onto each guide shaft in a radially movable state. When the spool-shaft directional position of the brake member is regulated by the operating member, the contact position of each moving member onto the tapered surface is changed in the radial direction of the brake member. Brake force can be thereby regulated in a stepwise manner.

In the centrifugal brake device described in Japanese Patent Application Publication No. 10-304799, a brake member includes a tapered surface with a diameter reduced towards a plurality of moving members, and the spool-shaft directional position of the brake member can be regulated by an operating member. Each moving member is disposed on a rotation member while being pivotable about an axis skew to a spool shaft. The tip of each moving member makes contact with the brake member. Even in the centrifugal brake device described in the publication, the spool-shaft directional position of the brake member can be thus regulated by the operating member.

SUMMARY

In the both well-known centrifugal brake devices, the spool is braked by moving the moving members radially outwards for making contact with the brake member. As to the centrifugal brake device described in Japanese Patent Application Publication No. 11-075643, brake force varies in proportion to the radial contact position of each moving member onto the brake member. In other words, brake force cannot be greatly changed, even if the radial position of each moving member is changed. Further, brake force can be regulated only in a narrow range because the radial position cannot be greatly changed.

As to the centrifugal brake device described in Japanese Patent Application Publication No. 10-304799, each moving member is configured to pivot about the axis skew to the spool shaft. The spool-shaft directional size of the centrifugal brake device is thereby larger than that described in Japanese Patent Application Publication No. 11-075643. Therefore, the entire reel size is increased. Further, the pivot range of each moving member (i.e., the radial position) is changed in response to slight change in the spool-shaft directional position of the brake member. It is thereby difficult to obtain stable brake force.

A centrifugal brake device for a dual-bearing reel is provided. The centrifugal brake device is configured to brake a spool rotatably attached to a reel unit by centrifugal force. The centrifugal brake device includes a rotation member, a first brake shoe and a brake drum. The rotation member is configured to be rotated at least in conjunction with rotation of the spool in a fishing-line releasing direction. The first brake shoe includes a first end and a second end, where the first brake shoe is pivotably attached to the rotation member about an axis arranged in parallel to a rotation shaft of the spool, and the axis is arranged between the first end and a center of gravity of the first brake shoe. The brake drum is disposed inwards of the first brake shoe in a radial direction of the rotation member. The brake drum has different diameters and includes an outer peripheral surface. The outer peripheral surface is configured to contact with the first end of the first brake shoe.

BRIEF DESCRIPTION OF THE DRAWINGS

Referring now to the attached drawings which form a part of this original disclosure:

FIG. 10 is a table for calculating brake force for the respective pivot positions;

DETAILED DESCRIPTION OF THE EMBODIMENTS

Figure 1:
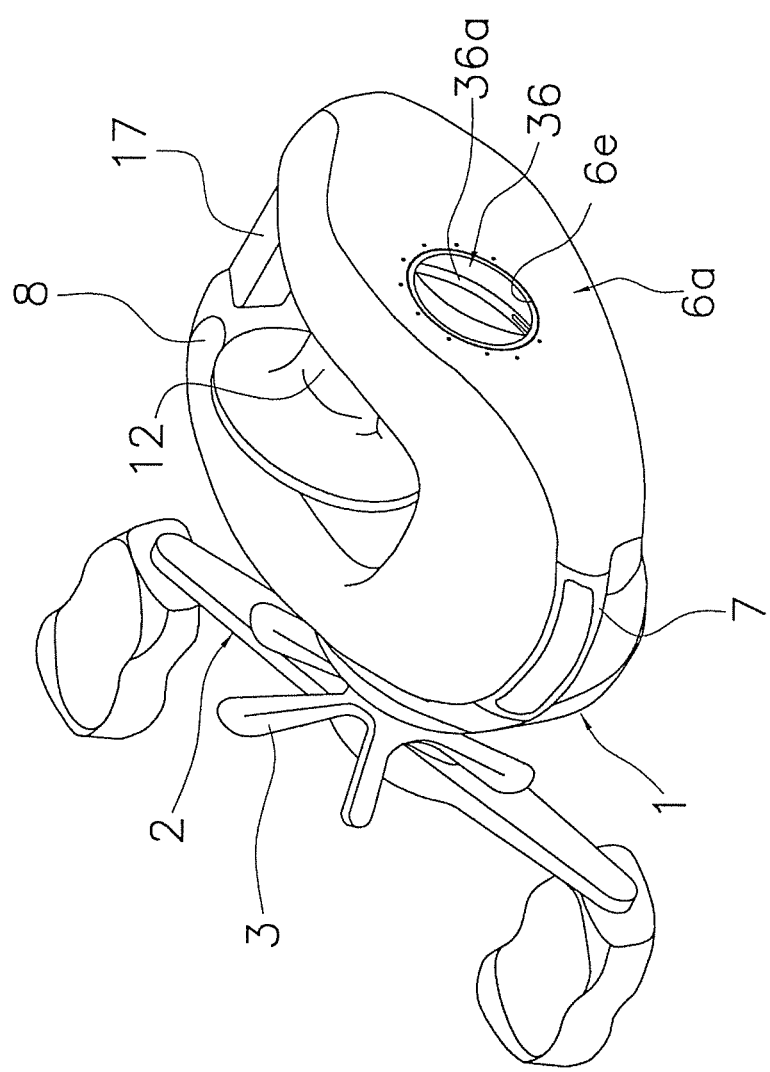
FIG. 1 is a perspective view of a dual-bearing reel adopting an exemplary embodiment of the present invention.

As illustrated in FIG. 1, a fishing reel of an exemplary embodiment of the present invention is a compact low profile dual-bearing reel for bait-casting. The dual-bearing reel includes a reel unit 1, a handle 2 for spool, and a star drag 3 for drag regulation. The handle 2 is disposed lateral to the reel unit 1. The star drag 3 is disposed on the reel unit side of the handle 2.

Reel Unit

Figure 2:
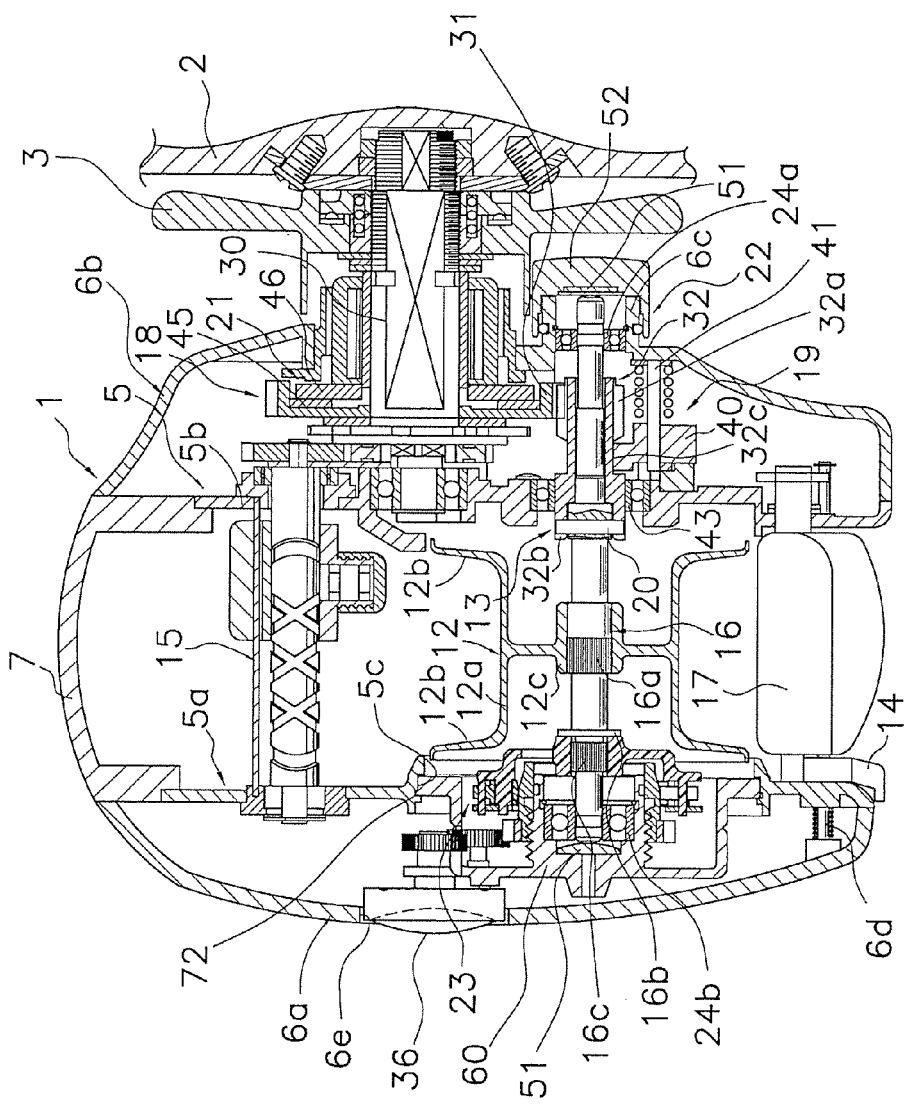
FIG. 2 is a cross-sectional top view of the dual-bearing reel.

As illustrated in FIG. 2, the reel unit 1 includes a frame 5 and a pair of first and second side covers 6a and 6b attached to the both lateral sides of the frame 5. As illustrated in FIG. 1, the reel unit 1 further includes a front cover 7 and a thumb rest 8. The front cover 7 covers the front of the reel unit 1, whereas the thumb rest 8 covers the top of the reel unit 1. Further, a spool 12 for winding a fishing line is attached to the inside of the reel unit 1 in a rotatable and detachable state.

As illustrated in FIG. 2, the frame 5 includes a pair of first and second side plates 5a and 5b and a plurality of coupling members (not illustrated in the figures). The first and second side plates 5a and 5b are opposed at a predetermined interval, while being coupled by the coupling members. The first side plate 5a includes an opening 5c with an increased diameter in a stepwise fashion for allowing the spool 12 to pass therethrough. The diameter of the opening 5c is herein increased towards the first side cover 6a in a stepwise fashion.

The first side cover 6a is attached to an open/close shaft 6d, and can be thereby set to be in either an opened position or a closed position. The open/close shaft 6d is attached to the rear part of the first side plate 5a and that of the second side plate 5b while being rotatable and axially movable. Further, an end of the open/close shaft 6d is fixed to the first side cover 6a. The open/close shaft 6d is locked in the closed position by an axially pivotable open/close lever 14. The first side cover 6a includes an opening 6e for exposing an operating member 36 to the outside of the first side cover 6a. The operating member 36 is operated for regulating brake force of a centrifugal brake mechanism 23. The second side cover 6b is fixed to the second side plate 5b by means of screws.

As illustrated in FIG. 2, the frame 5 accommodates the spool 12, a level winding mechanism 15, and a clutch lever 17. The level winding mechanism 15 is configured to uniformly wind the fishing line onto the spool 12. The clutch lever 17 functions as a thumb pad in thumbing the fishing line. The clutch lever 17 is aligned with the open/close lever 14. The spool 12 is allowed to pass through the opening 5c formed in the first side plate 5a. Further, a gear mechanism 18, a clutch mechanism 13, a clutch control mechanism 19, a drag mechanism 2, and a casting control mechanism 22 are disposed between the frame 5 and the second side cover 6b. The gear mechanism 18 is configured to transfer rotational force of the handle 2 to the spool 12 and the level winding mechanism 15. The clutch control mechanism 19 is configured to execute engagement/disengagement and control of the clutch mechanism 13 in response to an operation of the clutch lever 17. The casting control mechanism 22 is configured to regulate resistance to be applied during rotation of the spool 12. On the other hand, the centrifugal brake mechanism 23 (an exemplary centrifugal brake device) is disposed between the frame 5 and the first side cover 6a. The centrifugal brake mechanism 23 is configured to prevents backlash in casting the fishing rod.

Spool and Spool Shaft

As illustrated in FIG. 2, the spool 12 includes a bobbin trunk 12a, a pair of right and left flanges 12b, and a boss 12c. The bobbin trunk 12a is a tubular member that the fishing line is wound onto the outer periphery thereof. The flanges 12b are integrally formed with the bobbin trunk 12a. The flanges 12b protrudes radially outwards from the both axial ends of the bobbin trunk 12a. The boss 12c is fixed to a spool shaft 16 (an exemplary rotation shaft of the spool 12) by means of an arbitrary fixation method such as press-fitting. The spool 12 is thereby coupled to the spool shaft 16 in a unitarily rotatable state.

As illustrated in FIG. 2, the spool shaft 16 extends outwards of the second side cover 6b while penetrating the second side plate 5b. One end of the spool shaft 16 is rotatably supported by a boss 6c formed on the second side cover 6b through a first bearing 24a. On the other hand, the other end of the spool shaft 16 is rotatably supported within the centrifugal brake mechanism 23 through a second bearing 24b.

An engaging pin 20, which forms a part of the clutch mechanism 13, is fixed to a part of the spool shaft 16 that penetrates the second side plate 5b. Specifically, the engaging pin 20 penetrates the spool shaft 16 along its diameter. The both ends of the engaging pin 20 protrude radially from the spool shaft 16. The spool shaft 16 includes a first serration 16a on the outer periphery thereof. The first serration 16a is disposed on a part of the spool shaft 16 that is fixed to the spool 12. The first serration 16a functions as an anti-rotation element in press-fitting the spool 12 onto the spool shaft 16. Further, the spool shaft 16 includes a large-diameter flanged portion 16b on the outer periphery thereof. The flanged portion 16b is disposed on the first-side-cover side of the first serration 16a. The flanged portion 16b is formed for positioning a rotation member 62 (to be described) of the centrifugal brake mechanism 23. Yet further, the spool shaft 16 includes a second serration 16c on the outer periphery thereof. The second serration 16c is disposed on the first-side-cover side of the flanged portion 16b. The second serration 16c functions as an anti-rotation element in press-fitting the rotation member 62 onto the spool shaft 16.

Centrifugal Brake Mechanism

Figure 3:
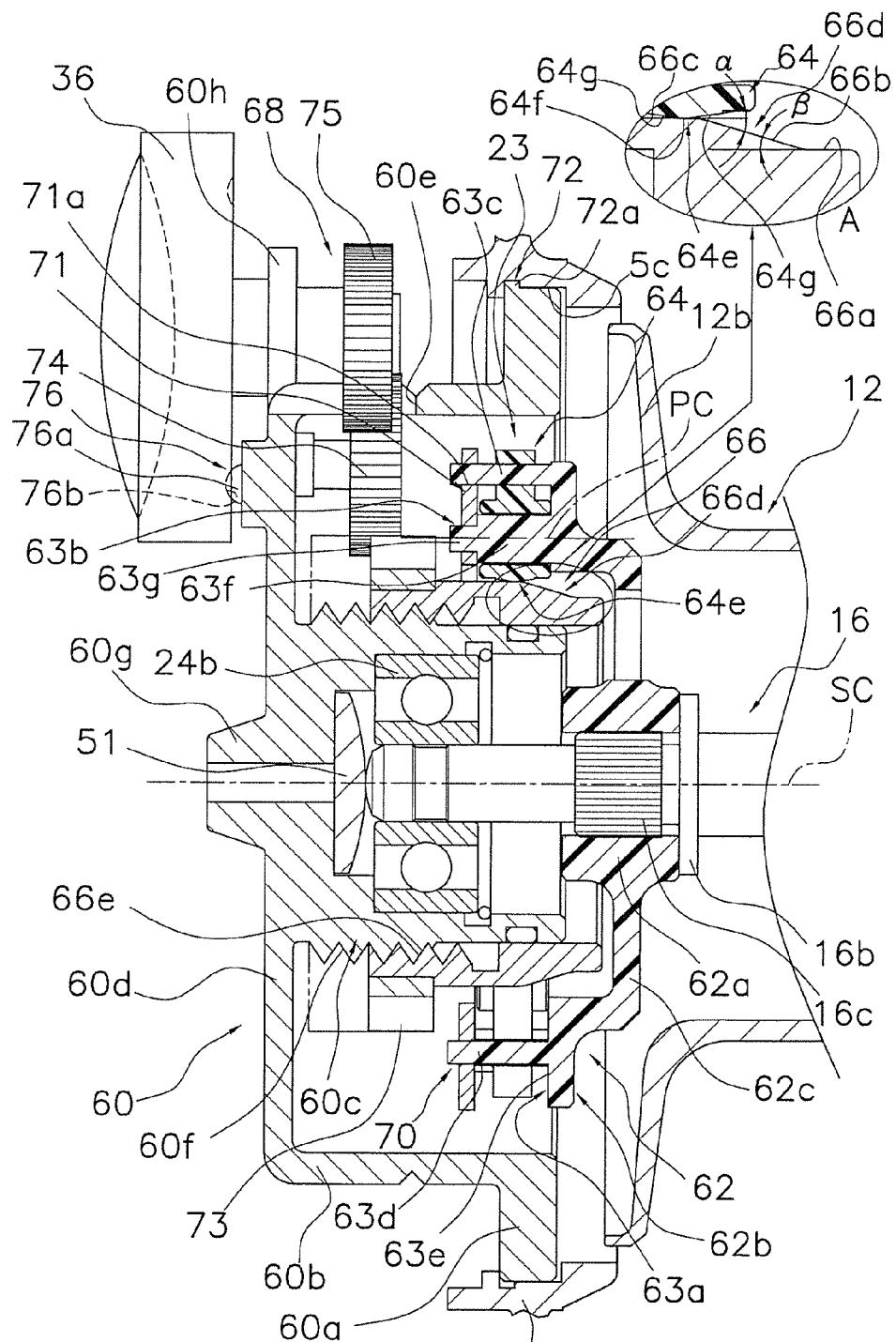
FIG. 3 is an enlarged cross-sectional view of a centrifugal brake mechanism.

As illustrated in FIG. 3, the centrifugal brake mechanism 23 includes a brake case 60, the rotation member 62, a plurality of (e.g., six) brake shoes 64, a brake drum 66, a moving mechanism 68 including the operating member 36, and an on/off switching mechanism 70 (an exemplary switching mechanism). The brake case 60 is detachably attached to the opening 5c of the first side plate 5a by a bayonet structure 72 including a plurality of tabs 72a. With the structure, the spool 12 is allowed to be detached from the reel unit 1 when the first side cover 6a is opened and the brake case 60 is detached therefrom.

Brake Case

The brake case 60 is a closed-end tubular member made of metal or synthetic resin. The brake case 60 includes an annular attached plate 60a, an outer tubular portion 60b, an inner tubular portion 60c, and a disc-shaped coupling portion 60d. The outer tubular portion 60b is integrally formed with the inner periphery of the attached plate 60a. The inner tubular portion 60c is disposed radial inwards of the outer tubular portion 60b. The coupling portion 60d couples the outer tubular portion 60b and the inner tubular portion 60c.

The outer peripheral surface of the attached plate 60a is disposed in the opening 5c. The attached plate 60a includes the plural tabs 72a of the bayonet structure 72 on the outer periphery thereof. The plural tabs 72a are disposed at predetermined intervals in the circumferential direction of the attached plate 60a. The outer tubular portion 60b partially includes a notch 60e for disposing the moving mechanism 68 therethrough. The inner tubular portion 60c accommodates the aforementioned second bearing 24b and one of friction plates 51. The inner tubular portion 60c includes a male threaded portion 60f on the outer periphery thereof. The male threaded portion 60f is screwed into the brake drum 66. The coupling portion 60d includes an operating knob 60g on the outer surface thereof. The operating knob 60g is used and operated for attachment/detachment of the brake case 60. Specifically, the brake case 60 can be attached to or detached from the first side plate 5a, when the brake case 60 is rotated with the operating knob 60g being held. Further, the coupling portion 60d includes a mechanism attached portion 60h extending radially outwards for attaching the moving mechanism 68 thereto.

Rotation Member

Figure 4:
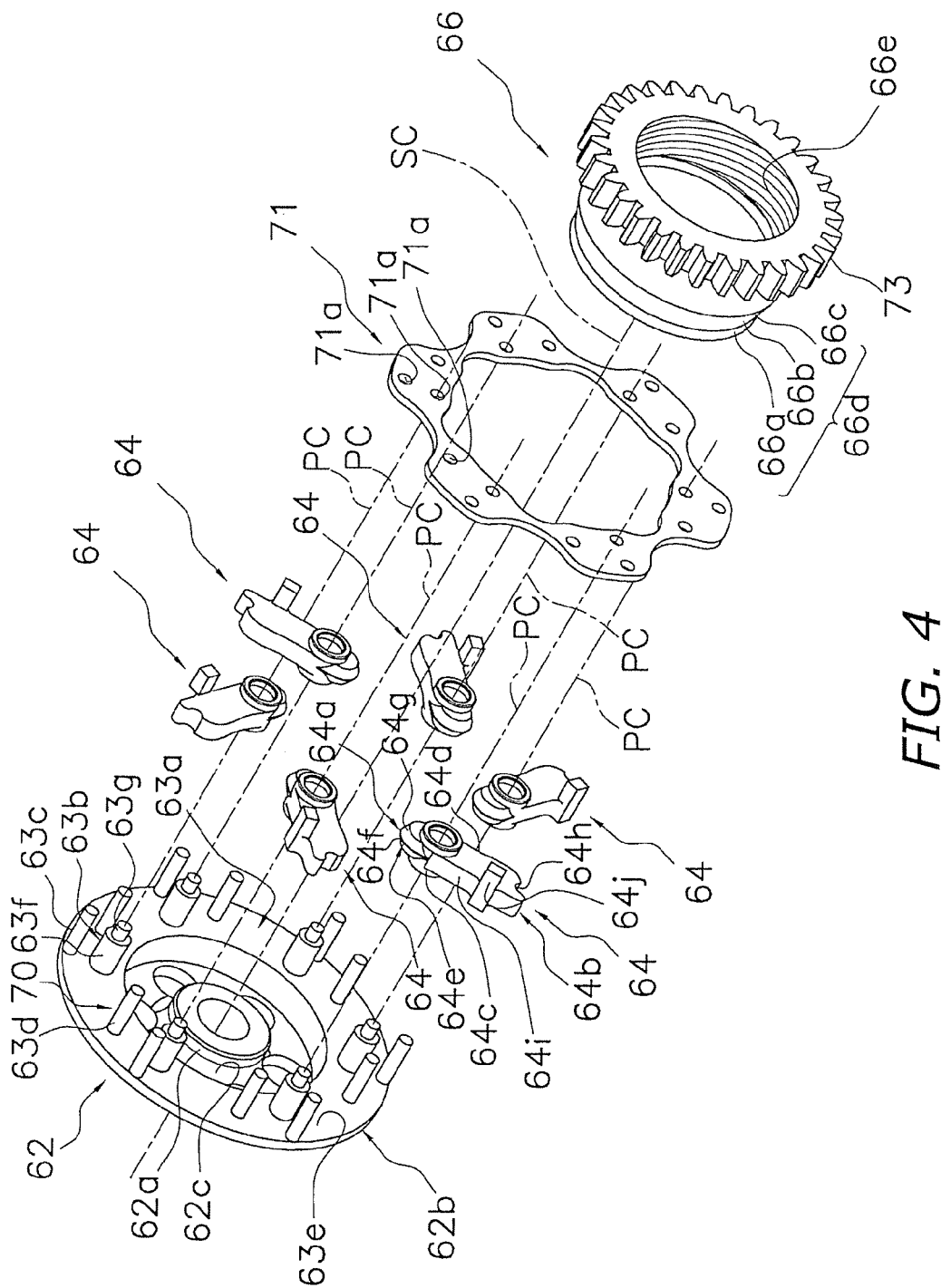
FIG. 4 is an exploded perspective view of the centrifugal brake mechanism.

The rotation member 62 is a roughly disc-shaped member made of synthetic resin (polyamide resin, polyacetal resin, etc.). The rotation member 62 is configured to be rotated at least in conjunction with rotation of the spool 12 in the fishing-line releasing direction. As illustrated in FIGS. 3 and 4, the rotation member 62 is coupled to the spool shaft 16 in a unitarily rotatable state by an arbitrary fixation method such as press-fitting. In the present exemplary embodiment, the rotation member 62 is press-fitted and fixed onto the second serration 16c. The rotation member 62 is axially positioned by the flanged portion 16b of the spool shaft 16.

The rotation member 62 includes a tubular boss 62a, an annular shoe attached portion 62b and a connecting portion 62c. The inner periphery of the boss 62a is fixed onto the spool shaft 16. The shoe attached portion 62b is disposed radially outwards of the boss 62a. The connecting portion 62c connects the boss 62a and the shoe attached portion 62b. The boss 62a, which is formed in a tubular shape, is press-fitted and fixed onto the second serration 16c while being axially positioned by the flanged portion 16b of the spool shaft 16.

Figure 5:
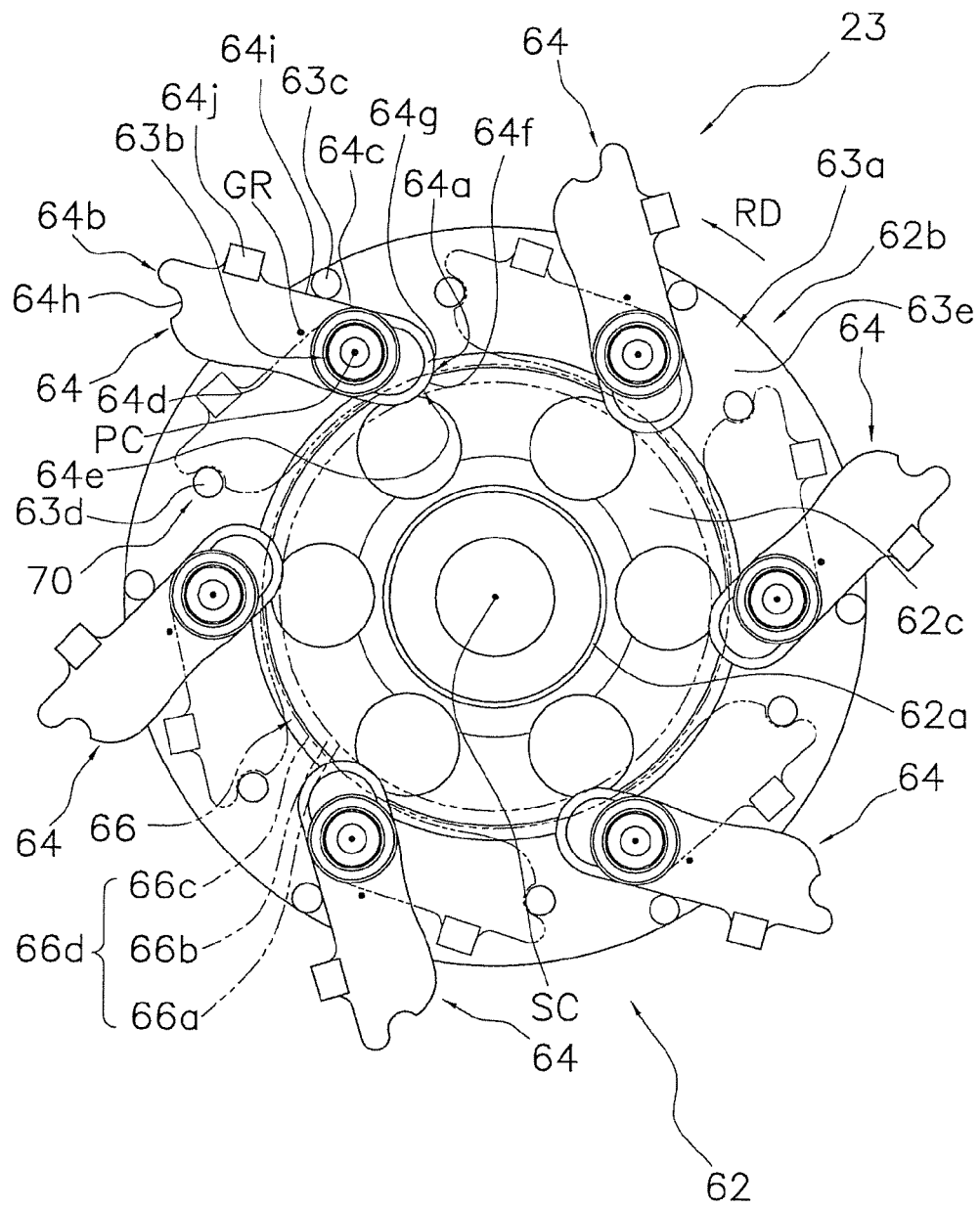
FIG. 5 is a front view of the centrifugal brake mechanism.

As illustrated in FIG. 4, the shoe attached portion 62b includes a main body 63a, a plurality of (e.g., six) shoe supporting portions 63b and a plurality of (e.g., six) pivot restricting portions 63c. The main body 63a is a ring plate portion. The shoe supporting portions 63b are disposed on the main body 63a. The pivot restricting portions 63c are also disposed on the main body 63a. The main body 63a includes an attached surface 63e on the brake-case side surface thereof. The attached surface 63e is arranged perpendicularly to the spool shaft 16. The plural shoe supporting portions 63b are disposed at equal intervals along the rotational direction of the spool 12. Each shoe supporting portion 63b is a pivot shaft for supporting each brake shoe 64 in a pivotable state. The shoe supporting portions 63b are arranged in parallel to the spool shaft 16. The shoe supporting portions 63b extend from the attached surface 63e towards the brake case 60. Each shoe supporting portion 63b includes a large-diameter pivot supporting portion 63f and a small-diameter tip 63g. Each brake shoe 64 is pivotably attached to each pivot supporting portion 63f. Each pivot restricting portion 63c prevents each brake shoe 64 from pivoting towards the brake drum 66 in a contact direction. Each pivot restricting portion 63c, which is formed in a round bar shape, extends from the attached surface 63e towards the brake case 60 while being arranged in parallel to the spool shaft 16. The main body 63a further includes a plurality of (e.g., six) switching protrusions 63d. The switching protrusions 63d are integrally formed with the main body 63a, and form a part of the on/off switching mechanism 70. The on/off switching mechanism 70 is configured to switch the brake shoes 64 between an activated state and a non-activated state. In the activated state, the brake shoes 64 are allowed to make contact with the brake drum 66. FIG. 5 illustrates the brake shoes 64 in the activated state with a solid line. In the non-activated state, in contrast, the brake shoes 64e are prevented from making contact with the brake drum 66. FIG. 5 illustrates the brake shoes 64 in the non-activated state with a dashed two-dotted line. Each switching protrusion 63d, formed in a round bar shape, extends from the attached surface 63e towards the brake case 60 while being arranged in parallel to the spool shaft 16. Similarly to the shoe supporting portions 63b, the pivot restricting portions 63c and the switching protrusions 63d are disposed at equal intervals along the rotational direction of the spool 12.

The connecting portion 62c is a tubular closed-end member integrally formed with the outer periphery of the boss 62a. The main body 63a of the shoe attached portion 62b is integrally formed with the outer peripheral end surface of the connecting portion 62c.

A retainer member 71, which is formed in a petal shape, is detachably attached to the tips 63g of the shoe supporting portions 63b, the tips of the pivot restricting portions 63c and the tips of the switching protrusions 63d. The retainer member 71 is disposed for preventing the brake shoes 64 from being detached from the rotation member 62. The retainer member 71 is disposed on the outer peripheral side of the brake drum 66. The retainer member 71 is made of metal such as aluminum alloy. The retainer member 71 includes a plurality of (e.g., 18) retaining holes 71a for allowing the tips 63g of six shoe supporting portions 63b, the tips of six pivot restricting portions 63c and the tips of six switching protrusions 63d to be inserted therein. Each retaining hole 71a has a diameter slightly less than that of a corresponding one of the tip 63g of each shoe supporting portion 63b, the tip of each pivot restricting portion 63c and the tip of each switching protrusion 63d. Therefore, the retaining holes 71a are elastically engaged with the tips of the shoe supporting portions 63b, the pivot restricting portions 63c and the switching protrusions 63d.

Brake Shoe

As illustrated in FIGS. 4 and 5, six brake shoes 64 are roughly elongated plate members made of synthetic resin (polyamide, polyacetal, etc.). The brake shoes 64 are disposed at predetermined intervals along the rotational direction of the spool 12. Each brake shoe 64 includes a first end 64a and a second end 64b. The first end 64a is allowed to make contact with the brake drum 66, whereas the second end 64b is prevented from making contact with the brake drum 66. Further, each brake shoe 64 includes a boss 64c disposed between the first end 64a and a center of gravity GR. The boss 64c is pivotably attached onto the pivot supporting portion 63f of the corresponding one of the shoe supporting portions 63b of the rotation member 62. The axial length of the boss 64c is slightly shorter than that of each pivot supporting portion 63f (e.g., by 0.2 mm to 1 mm). A pivot axis PC of each brake shoe 64, which is the center of each pivot supporting portion 63f, is disposed between the center of gravity GR and the first end 64a. Each brake shoe 64 is supported by the rotation member 62 under the following condition. When the spool 12 is rotated in a fishing-line releasing direction RD (see FIG. 5), the first end 64a of each brake shoe 64 is disposed upstream in the rotational direction of the spool 12 while the second end 64b thereof is disposed downstream in the rotational direction of the spool 12.

Each brake shoe 64 includes an inner surface 64d connecting the first end 64a and the second end 64b. The inner surface 64d is one of the lateral surfaces of each brake shoe 64, which is disposed inwards in the radial direction of the rotation member 62. The inner surface 64d is allowed to be opposed to the brake drum 66. The inner surface 64d is shaped for separating away from the outer peripheral surface of the brake drum 66 when each brake shoe 64 is set to be in the non-activated state. Specifically, the inner surface 64d is a curved surface of a circular-arc shape. Further, each brake shoe 64 includes a contact surface 64e on the first end 64a thereof. The contact surface 64e, which has a semicircular shape, makes contact with the brake drum 66. As illustrated in Inset A of FIG. 3, the contact surface 64e includes a protruding surface 64f and a pair of slopes 64g. The protruding surface 64f is formed in the center part of the first end 64a in the thickness direction of the brake shoe 64. The slopes 64g are tapered surfaces formed on the both sides of the protruding surface 64f in the thickness direction of the brake shoe 64. Each slope 64g is slanted at a predetermined slant angle $\alpha$ with respect to the protruding surface 64f. For example, the slant angle $\alpha$ of each slope 64g is set to be 26.6 degrees. As illustrated in FIGS. 4 and 5, each brake shoe 64 further includes a switching recess 64h on the second end 64b thereof. The switching recess 64h of each brake shoe 64 is engaged with corresponding one of the switching protrusions 63d. The on/off switching mechanism 70 is formed by a plurality of pairs of the switching protrusion 63d and the switching recess 64h. The switching recess 64h of each brake shoe 64 is herein engaged with the corresponding one of the switching protrusions 63d for elastically holding each brake shoe 64 in the non-activated state. Further, each brake shoe 64 includes an outer surface 64i. The outer surface 64i is the other of the lateral surfaces of each brake shoe 64, which is disposed outwards in the radial direction of the rotation member 62. Each brake shoe 64 includes a switch operating portion 64j on the outer surface 64i. The switch operating portion 64j is used for switching each brake shoe 64 from the activated state to the non-activated state and vice versa. The switch operating portion 64j is disposed further away from the pivot axis PC than the center of gravity GR is. The switch operating portion 64j extends from the outer surface 64j toward the brake case 60. Brake force can be regulated in more various levels with the on/off switching mechanism 70 by changing the number of the brake shoes 64 contactable with the brake drum 66.

In conjunction with rotation of the spool 12, each brake shoe 64 pivots about the pivot axis PC in the clockwise direction (see FIG. 5) by centrifugal force acting on the center of gravity GR. The outer surface 64i of each brake shoe 64 is a flat surface. A part of the outer surface 64i, which is disposed between the pivot axis PC and the center of gravity GR, makes contact with the corresponding one of the pivot restricting portions 63c. Accordingly, each brake shoe 64 is restricted from pivoting in the clockwise direction (see FIG. 5). As a result, each brake shoe 64 is prevented from easily biting into the brake drum 66 even when pivoting in the clockwise direction (see FIG. 5) in conjunction with rotation of the spool 12 in a fishing-line winding direction.

Brake Drum

As illustrated in FIGS. 3, 4 and 5, the brake drum 66 is a tubular member disposed inwards of the brake shoes 64 in the radial direction of the rotation member 62. The brake drum 66 is made of relatively hard metal such as zinc alloy. The brake drum 66 includes an outer peripheral surface 66d. The outer peripheral surface 66d includes a first horizontal surface 66a, a tapered surface 66b, and a second horizontal surface 66c having a diameter greater than that of the first horizontal surface 66a. The first horizontal surface 66a, the tapered surface 66b, and the second horizontal surface 66c are sequentially disposed, while the first horizontal surface 66a is disposed closer to the rotation member 62, i.e., closer to the spool 12. In other words, the brake drum 66 includes the outer peripheral surface 66d contactable with the brake shoes 64 with different diameter settings. When each brake shoe 64 pivots by centrifugal force, the contact surface 64e formed on the first end 64a of each brake shoe 64 makes contact with the first horizontal surface 66a, the tapered surface 66b and the second horizontal surface 66c. The tapered surface 66b has a diameter gradually reduced from the second horizontal surface 66c towards the first horizontal surface 66a. The diameter of the first horizontal surface 66a is herein set to be in a range of 85-95% of that of the second horizontal surface 66c. In the present exemplary embodiment, the diameter of the first horizontal surface 66a is set to be 14.5 mm, while the diameter of the second horizontal surface 66c is set to be 15.7 mm. Further, the axial length of the tapered surface 66b is set to be 2 mm. Therefore, a slant angle $\beta$ of the tapered surface 66b with respect to the first horizontal surface 66a (see Inset A of FIG. 3) is set to be 16.7 degrees, for instance, and is less than the slant angle $\alpha$ (=26.6 degrees) of the slope 64g of each brake shoe 64. When making contact with each brake shoe 64, the tapered surface 66b makes contact with a boundary between the protruding surface 64f and one of the slopes 64g in the contact surface 64e of each brake shoe 64.

The brake drum 66 includes a female threaded portion 66e on the inner peripheral surface thereof. The female threaded portion 66e is screwed onto the male threaded portion 60f of the brake case 60. The female threaded portion 66e has an axial length greater than that of the tapered surface 66b. In the present exemplary embodiment, the axial length of the female threaded portion 66e is formed in a range of 3.5-5 mm. Each of the male threaded portion 60f and the female threaded portion 66e is a multiple thread screw (e.g., a triple thread screw) having a thread pitch of, e.g., 1.75 mm. In other words, the brake drum 66 is configured to be moved by 5.25 mm per rotation in the spool shaft direction. With the multiple thread screw, the brake drum 66 can be greatly moved in the spool shaft direction with respect to an operational rotation amount of the operating member 36. Further, a first gear member 73, which forms a part of the moving mechanism 68, is coupled to the outer peripheral surface of the brake drum 66 in a unitarily rotatable state. The first gear member 73 is configured to be rotated in conjunction with a rotational operation of the operating member 36. In conjunction with rotation of the first gear member 73, the brake drum 66 is configured to be moved in the spool shaft direction.

Moving Mechanism

The moving mechanism 68 is configured to move and position the brake shoes 64 and the brake drum 66 in the spool shaft direction. As illustrated in FIG. 3, the moving mechanism 68 includes the operating member 36, the first gear member 73, a second gear member 74, and a third gear member 75. The second gear member 74 is meshed with the first gear member 73. The third gear member 75 is meshed with the second gear member 74 while being unitarily rotatable with the operating member 36. The operating member 36 is rotatably attached to the mechanism attached portion 60h of the brake case 60. The first gear member 73 is configured to be moved together with the brake drum 66 in the spool shaft direction. Therefore, the first gear member 73 has a large thickness for meshing with the second gear member 74 regardless of a moving position of the brake drum 66. The second gear member 74 is rotatably attached to the mechanism attached portion 60h of the brake case 60. A gear ratio of the third gear member 75 to the first gear member 73 is set to be in a range of 1/3 to 1/1, for instance.

The operating member 36 is configured to be set in one of the operating positions corresponding to a plurality of levels (e.g., in a range of 6 to 20 levels) by a positioning mechanism 76. The positioning mechanism 76 is disposed between the operating member 36 and the mechanism attached portion 60h. In the present exemplary embodiment, the operating member 36 is set to be in one of the positions corresponding to 10 levels. For example, the positioning mechanism 76 includes a positioning pin 76a and a plurality of (e.g., 11) positioning recesses 76b, any one of which the positioning pin 76a is engaged with. The positioning pin 76a is attached to the mechanism attached portion 60h while being allowed to be projected from and retracted to the mechanism attached portion 60h. The positioning pin 76a is urged by a coil spring (not illustrated in the figures) in the projecting direction. The components forming the positioning mechanism 76 are not limited to the positioning pin 76a and the positioning recesses 76b. The positioning mechanism 76 can be formed by any suitable component or components as long as the operating member 36 can be positioned by the component or components. As illustrated in FIGS. 1 and 3, the operating member 36 includes a knob portion 36a having recesses on the both sides. An angler can regulate brake force by holding and rotating the knob portion 36a of the operating member 36.

When the operating member 36 is operated and rotated in the clockwise direction from an operation starting position illustrated in FIG. 1, the third gear member 75 is rotated, and further, the first gear 73 is rotated through the second gear member 74. In conjunction, the brake drum 66 is rotated. It should be noted that the operation starting position is an operating position for producing the smallest brake force. In rotating the operating member 36 in the clockwise direction, the brake drum 66 is moved in a direction away from the pool 12 due to the structure that the brake drum 66 is screwed onto the brake case 60. In further rotating and setting the operating member 36 to the operating position of the maximum level, the brake drum 66 is moved to the maximum brake position closest to the spool 12 as illustrated in FIG. 3. Thus, brake force of the centrifugal brake mechanism 23 can be regulated in a plurality of levels.

Other Reel Components

As illustrated in FIG. 2, the gear mechanism 18 includes a handle shaft 30, a drive gear 31 and a pinion gear 32. The drive gear is fixed onto the handle shaft 30. The pinion gear 32 is a tubular gear meshed with the drive gear 31. The handle shaft 30 is rotatably supported by the second side plate 5b and the second side cover 6b. The drive gear 31 is rotatably supported by the handle shaft 30. Rotation of the handle shaft 30 is transmitted to the drive gear 31 through the drag mechanism 21. As illustrated in FIG. 2, the pinion gear 32 is a tubular member allowing the spool shaft 16 to penetrate the inner periphery thereof. The pinion gear 32 extends inwardly from the outside of the second side plate 5b. In other words, the pinion gear 32 is attached onto the spool shaft 16 while being axially movable. Further, the left end of the pinion gear 32 (see FIG. 2) is supported by the second side plate 5b through a bearing 43 while being rotatable and axially movable.

The pinion gear 32 includes a teeth portion 32a, an engaged groove 32b and a narrowed portion 32c. The teeth portion 32a is formed on the outer periphery of the right end of the pinion gear 32 (see FIG. 2). The teeth portion 32a is meshed with the drive gear 31. The engaged groove 32b is formed on the left end of the pinion gear 32 (see FIG. 2). The narrowed portion 32c is formed axially between the teeth portion 32a and the engaged groove 32b. More specifically, the engaged groove 32b is a groove recessed on an end surface of the pinion gear 32 along its diameter. The engaging pin 20 is engaged with the engaged groove 32b. When the pinion gear 32 is herein moved outwards, the engaging pin 20 is disengaged from the engaged groove 32b. Under the condition, rotational force of the handle shaft 30 is prevented from being transmitted to the spool 12. The engaged groove 32b and the engaging pin 20 form the clutch mechanism 13. When the engaging pin 20 is engaged with the engaged groove 32b, in contrast, torque is transmitted from the pinion gear 32 to the spool shaft 16.

The clutch lever 17 is disposed behind the spool 12 while being disposed between the pair of the first and second side plates 5a and 5b. The clutch lever 17 is attached to the reel unit 1 while being movable up and down (i.e., in a direction perpendicular to the diagram of FIG. 2). The clutch lever 17 is moved between an upper position (i.e., a clutch-on position) and a lower position (i.e., a clutch-off position).

As illustrated in FIG. 2, the clutch control mechanism 19 includes a clutch yoke 40. The clutch yoke 40 is disposed on the outer peripheral side of the spool shaft 16. The clutch yoke 40 is supported by two pins 41 (only one of them is illustrated in the figure) while being movable in parallel to the axis of the spool shaft 16. The center part of the clutch yoke 40 is engaged with the narrowed portion 32c of the pinion gear 32.

With the structure, the pinion gear 32 is positioned in an inward clutch engaged position when the clutch lever 17 is set to be in the clutch-on position. Under the condition, the engaging pin 20 fixed to the spool shaft 16 is engaged with the engaged groove 32b, and a clutch-on state is thereby produced. When the clutch lever 17 is operated and set to be in the clutch-off position, in contrast, the pinion gear 32 is moved outwards by the clutch yoke 40 and the engaging pin 20 is disengaged from the engaged groove 32b. Accordingly, a clutch-off state is produced.

The drag mechanism 21 includes a drag plate 45 and a pressure plate 46. The drag plate 45 is pressed onto the drive gear 31. The pressure plate 46 is configured to press the drag plate 45 onto the drive gear 31 with a predetermined force by a rotational operation of the star drag 3. Drag force of the drag mechanism 21 is regulated by the rotational operation of the star drag 3.

The casting control mechanism 22 includes the pair of friction plates 51 and a brake cap 52. The friction plates 51 interpose the spool shaft 16 therebetween while holding the both ends of the spool shaft 16. The brake cap 52 is configured to regulate pressure of the friction plates 51 for interposing and holding the spool shaft 16 therebetween. The left-side friction plate 51 is attached to the inside of the brake case 60.

Actions of Centrifugal Brake Mechanism

Figure 6:
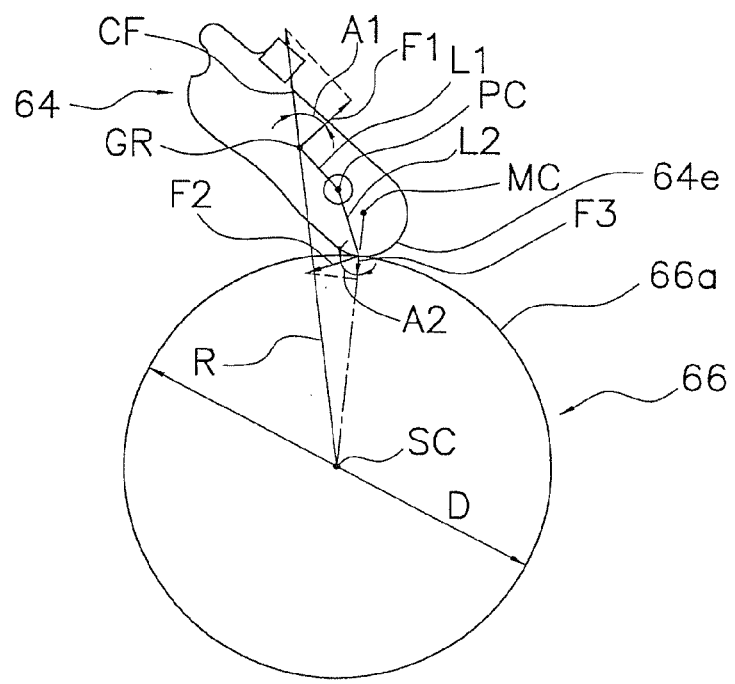
FIG. 6 is a diagram illustrating a pivot position of a brake shoe where brake drum diameter is set to be 14.5 mm.
Figure 7:
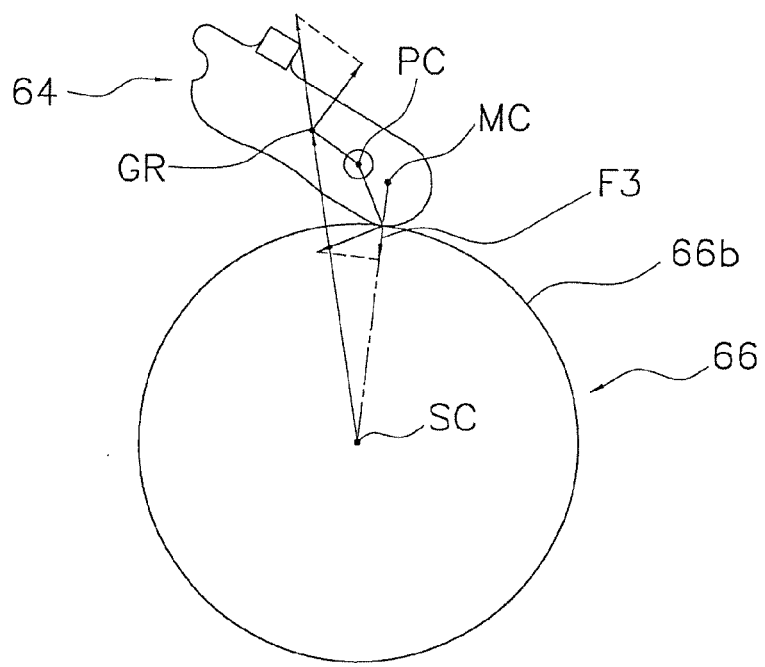
FIG. 7 is a diagram illustrating a pivot position of the brake shoe where the brake drum diameter is set to be 14.9 mm.
Figure 8:
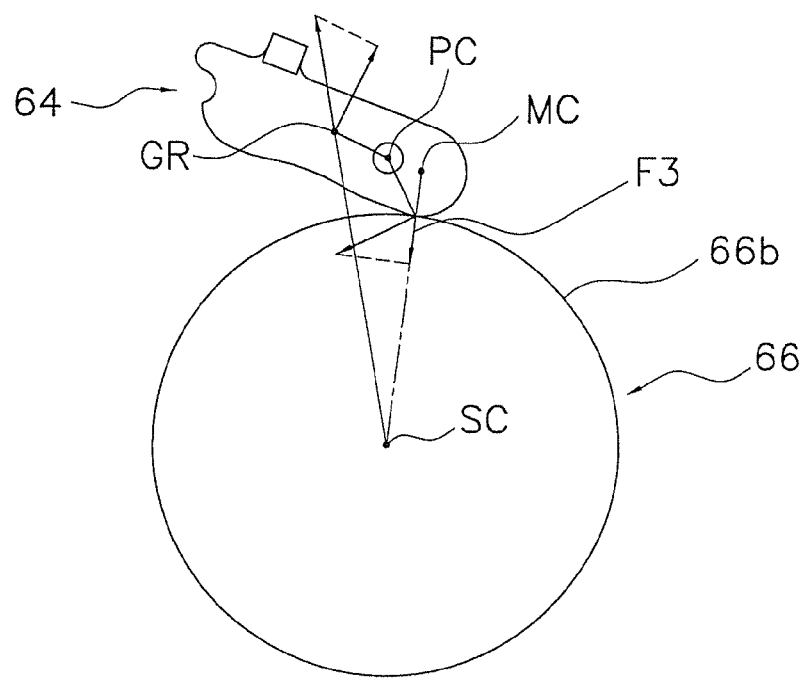
FIG. 8 is a diagram illustrating a pivot position of the brake shoe where the brake drum diameter is set to be 15.3 mm.
Figure 9:
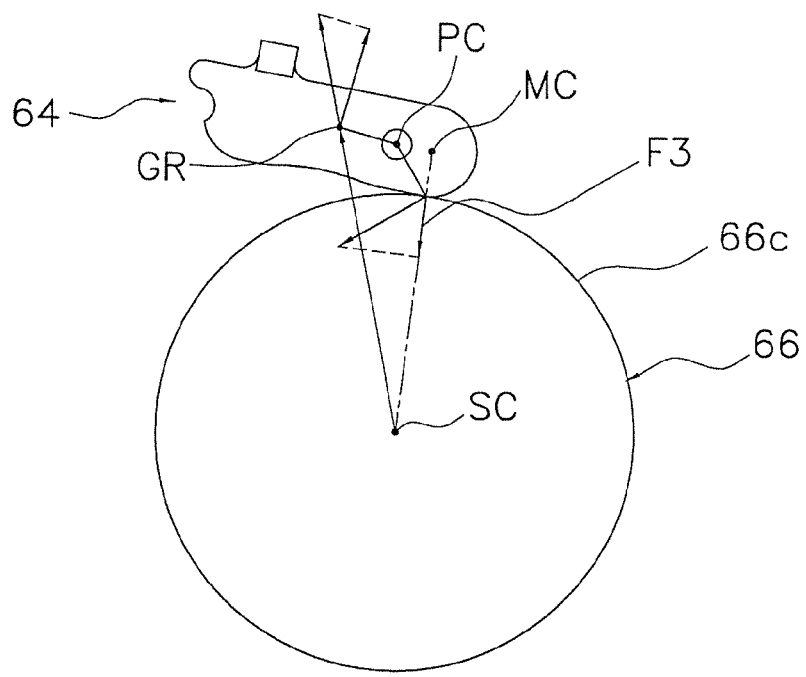
FIG. 9 is a diagram illustrating a pivot position of the brake shoe where the brake drum diameter is set to be 15.7 mm.
Figure 11:
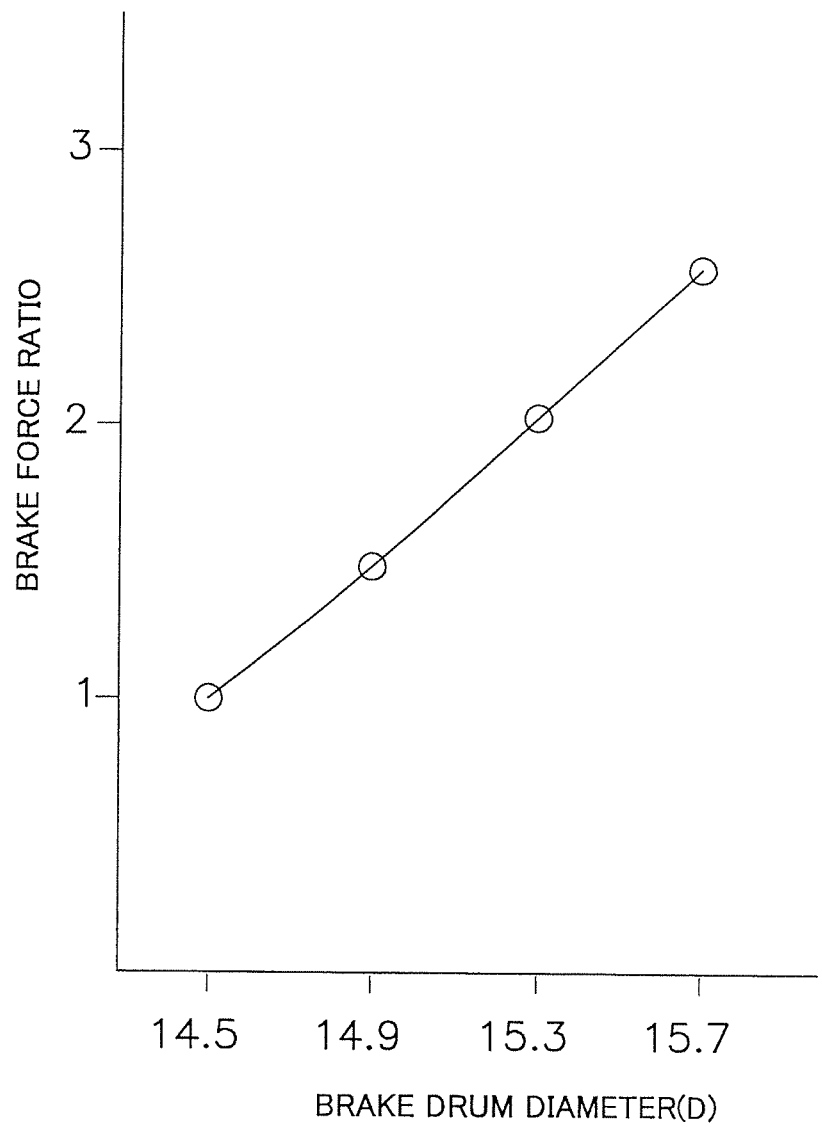
FIG. 11 is a chart showing brake force for the respective pivot positions.

When the operating member 36 is set to be in the operation starting position as illustrated in FIG. 1, for instance, the contact surface 64e of each brake shoe 64 makes contact with the first horizontal surface 66a in the centrifugal brake mechanism 23 as illustrated in FIG. 6. Now, brake force of the centrifugal brake mechanism 23 acting on the spool 12 will be calculated with reference to FIGS. 6 to 9. Specifically, brake force will be calculated for a minimum brake position (corresponding to the first horizontal surface 66a) illustrated in FIG. 6, a maximum brake position (corresponding to the second horizontal surface 66c) illustrated in FIG. 9 and two intermediate brake positions (corresponding to the tapered surface 66b) between the minimum brake position and the maximum brake position, where the diameter of the first horizontal surface 66a of the brake drum 66 is set to be 14.5 mm while the diameter of the second horizontal surface 66c is set to be 15.7 mm. More specifically, brake force is calculated for the intermediate brake position in FIG. 7 where the diameter of the tapered surface 66b is set to be 14.9 mm. Further, brake force is calculated for the intermediate brake position in FIG. 8 where the diameter of the tapered surface 66b is set to be 15.3 mm. Brake force in the respective brake positions will be hereinafter expressed by a ratio to the minimum brake force to be produced in the minimum brake position of FIG. 6. Further, centrifugal force in the respective brake positions will be hereinafter expressed by a ratio to the minimum centrifugal force to be produced in the maximum brake position of FIG. 9. FIG. 10 shows a calculating process for brake force in the respective brake positions. In the present exemplary embodiment, as is obvious from FIG. 10, brake force acting on the spool 12 by centrifugal force is increased in proportion to magnitude of the diameter of the brake drum 66.

Where centrifugal force acting on the center of gravity GR is defined as CF, it is noted that magnitude of the centrifugal force CF is proportion to a radial distance from a spool axis SC to the center of gravity GR. As shown in FIG. 10, centrifugal force is gradually increased towards the minimum brake position (corresponding to a diameter of 15.7 mm), where centrifugal force is set to be 1 in applying the maximum brake force on the spool 12 as illustrated in FIG. 1. Here, a force component of centrifugal force in the pivot direction, specifically, a force component F1 will be calculated. The force component F1 contributes to moment in a direction perpendicular to a line segment L1 connecting the pivot axis PC and the center of gravity GR. The force component F1 can be calculated by multiplying the centrifugal force CF and a cosine function of an angle A1 formed by the force component F1 and the centrifugal force CF (i.e., F1=CF×cos(A1)). In short, the force component F1 can be calculated based on the centrifugal force CF and the angle A1. It is clear that the calculated force component F1 is increased in proportion to magnitude of the diameter of the brake drum 66. Next, force F2 will be calculated by moment. The force F2 is a pivot directional force at a contact position between the contact surface 64e and the brake drum 66. The force F2 is calculated based on the force component F1, the line segment L1, and a line segment L2 connecting the pivot axis PC and the contact position between the contact surface 64e and the brake drum 66 (i.e., F2=F1×L1/L2). A force component of the calculated force F2 in the spool axis SC direction is brake force F3 of the centrifugal mechanism 23 acting on the spool 12. The brake force F3 can be calculated by multiplying the force F2 and a sine function of an angle A2 formed by the force F2 and the brake force F3 (i.e., F3=F2×sin(A2)). In short, when the angle A2 is calculated from the figures, the brake force F3 can be calculated using the calculated angle A2. FIG. 10 shows the calculation process. Further, FIG. 11 is a chart that plots brake force ratios for the respective brake force positions in FIG. 10. In FIG. 11, the horizontal axis is set as the diameter of the brake drum 66 (i.e., the brake position) while the vertical axis is set as the brake force ratio. As is obvious from FIGS. 10 and 11, brake force can be regulated in a range from the minimum brake force to the maximum brake force of slightly greater than 2.5 times as large as the minimum brake force.

In the centrifugal brake mechanism 23 with the aforementioned structure, the third gear member 75 is rotated in the clockwise direction when the operating member 36 is operated and rotated from the operation starting position in the clockwise direction, and further, the first gear member 73 is rotated in the clockwise direction through the second gear member 74. It should be noted that FIG. 5 illustrates the operating member 36 set to be in the minimum brake position (i.e., the operation starting position). When the operating member 36 is thus rotated in the clockwise direction, the brake drum 66 is rotated and moved, for instance, in a direction away from the spool 12. When the operating member 36 is further rotated to the maximum brake position, each brake shoe 64 makes contact with the second horizontal surface 66c. Accordingly, the maximum brake state is produced as described above and illustrated in FIGS. 3 and 9. When the operating member 36 is operated and rotated in the counter-clockwise direction, in contrast, brake force is gradually reduced.

In casting the fishing rod after regulation, the spool 12 is rotated in the fishing-line releasing direction. In conjunction with rotation of the spool 12, centrifugal force acts on the center of gravity GR of each brake shoe 64. Accordingly, each brake shoe 64 pivots about the axis arranged in parallel to the spool 12, and the contact surface 64e thereof makes contact with a regulated position on the outer peripheral surface of the brake drum 66. The spool 12 is thus braked by friction between each brake shoe 64 and the brake drum 66. It should be noted that brake force herein depends on the diameter of the brake drum 66 at the contact position.

Brake force of the centrifugal brake mechanism 23 herein varies depending on tilt of each brake shoe 64 (i.e., a contact position of each brake shoe 64 on the brake drum 66) without depending on centrifugal force. Therefore, brake force can be regulated in a variety of levels. Further, each brake shoe 64 pivots about the axis arranged in parallel to the spool shaft 16. It is thereby possible to inhibit increase in reel size in the spool shaft direction. In other words, the reel of the present exemplary embodiment is not required to be formed in a larger size, even though each brake shoe 64 is configured to pivot in the reel.

Features

The aforementioned exemplary embodiment can be realized, as follows.

(A) The centrifugal brake mechanism 23 is configured to brake the spool 12 rotatably attached to the reel unit 1 by centrifugal force. The centrifugal brake mechanism 23 includes the rotation member 62, at least one brake shoe 64 and the brake drum 66. The rotation member 62 is configured to be rotated at least in conjunction with rotation of the spool 12 in the fishing-line releasing direction. Each of the brake shoe/shoes 64 includes the first end 64a and the second end 64b. Each brake shoe 64 is attached to the rotation member 62 while being pivotabe about the axis that is arranged in parallel to the spool shaft 16 and disposed between the first end 64a and the center of gravity GR. The brake drum 66 is disposed inwards of the brake shoe/shoes 64 in the radial direction of the rotation member 62. The brake drum 66 includes the outer peripheral surface 66d formed by portions with different diameters. The portions with different diameters can make contact with the first end 64a of each pivotable brake shoe 64.

In the centrifugal brake mechanism 23, each brake shoe 64 is attached to the rotation member 62 while being pivotable about an axis arranged in parallel to the spool shaft 16. Further, the brake drum 66 includes the outer peripheral surface 66d formed by portions with different diameters. The portions with different diameters can make contact with the first end 64a of each brake shoe 64. Yet further, the pivot axis of each brake shoe 64 is arranged between the center of gravity GR and the first end 64a making contact with the brake drum 66. Therefore, distance from the center of gravity GR to the brake drum 66 is increased in proportion to distance from the second end 64b of each brake shoe 64 to the brake drum 66, i.e., magnitude of the pivot angle of each brake shoe 64. In response, centrifugal force is increased. However, the force component F1, which is a component of centrifugal force in the pivot direction perpendicular to the line segment connecting the center of gravity GR and the pivot axis PC, is reduced in proportion to magnitude of the pivot angle of each brake shoe 64. Further, the force F2, produced by moment attributed to the force component F1 at the contact position, is directed away from the center of the brake drum 66 (i.e., the spool axis SC) in proportion to magnitude of the pivot angle of each brake shoe 64. This results in reduction in the brake force F3 that is directed towards the center of the brake drum 66 at the contact position. Therefore, brake force is greatly changed by tilt of each brake shoe 64 not by centrifugal force, and can be stably regulated in a variety of levels.

Further, each brake shoe 64 pivots about the axis arranged in parallel to the spool shaft 16. Therefore, the length of the centrifugal brake mechanism 23 in the spool shaft direction can be formed shorter than that of a centrifugal brake mechanism allowing each brake shoe 64 to pivot about an axis arranged skew to the spool shaft 16. Thus, increase in reel size can be inhibited.

(B) In the centrifugal brake mechanism 23, the brake drum 66 includes the tapered surface 66*b* on the outer peripheral surface thereof for allowing each brake shoe 64 to make contact therewith. The centrifugal brake mechanism 23 further includes the moving mechanism 68 configured to position and relatively move the brake shoe/shoes 64 and the brake drum 66 in the axial direction of the spool shaft 16.

In this case, either the brake drum 66 or each brake shoe 64 is axially moved and positioned by the moving mechanism 68. Accordingly, the contact position of the first end 64*a* of each brake shoe 64 onto the tapered surface 66*b* is changed in the radial direction, and the pivot angle of each brake shoe 64 is accordingly changed. Therefore, brake force can be regulated in a variety of levels by easily changing the pivot angle of each brake shoe 64.

(C) In the centrifugal brake mechanism 23, the diameter of the tapered surface 66*b* is reduced towards the spool 12. The pivot axis of each brake shoe 64 can be positioned closer to the axis of the spool shaft 16 as much as possible due to the tapered surface 66*b* with a diameter reduced towards the spool 12. In other words, increase in reel size in the radial direction can be inhibited.

(D) In the centrifugal brake mechanism 23, the moving mechanism 68 includes the operating member 3 that is movably attached to the reel unit 1 and exposed to the outside. The moving mechanism 68 is configured to position each brake shoe 64 and the brake drum 66 in different positions in accordance with the moving position of the operating member 36.

In this case, each brake shoe 64 and the brake drum 66 are positioned in any one of a plurality of axial positions by the operating member 36 exposed to the outside. Therefore, brake force can be regulated, for instance, without opening the first side cover 6*a* of the reel unit 1. In other words, brake force can be easily regulated.

(E) In the centrifugal brake mechanism 23, the plural brake shoes 64 are disposed at predetermined intervals along the rotational direction of the spool 12. In this case, large brake force can be obtained due to the plural brake shoes 64 thus disposed.

(F) The centrifugal brake mechanism 23 further includes the on/off switching mechanism 70. The on/off switching mechanism 70 is configured to switch at least one of the plural brake shoes 64 between the activated state and the non-activated state. The activated state allows each brake shoe 64 to make contact with the brake drum 66, whereas the non-activated state prevents each brake shoe 64 from making contact with the brake drum 66.

In this case, it is possible to change the number of the brake shoes 64 contactable to the brake drum 66 due to switching of at least one of the brake shoes 64 between the activated state and the non-activated state. Therefore, brake force can be regulated in more various levels by switching the state of at least one of the brake shoes 64.

(G) In the centrifugal brake mechanism 23, each brake shoe 64 includes the inner surface 64*d* connecting the first end 64*a* and the second end 64*b*. The inner surface 64*d* can be opposed to the brake drum 66 and is shaped for separating away from the other peripheral surface 66*d* of the brake drum 66 when each brake shoe 64 is set to be in the non-activated state.

In this case, each brake shoe 64, which is set to be in the non-activated state, is prevented from making contact with the brake drum 66 even when each brake shoe 64 is configured to pivot.

(H) In the centrifugal brake mechanism 23, each brake shoe 64 is supported by the rotation member 62 for positioning the first end 64*a* upstream in the rotational direction of the spool 12 and positioning the second end 64*b* downstream in the rotational direction of the spool 12, when the spool 12 is rotated in the fishing-line releasing direction.

In this case, the pivot axis PC is arranged further downstream than the first end 64*a* in the rotational direction of the spool 12 when the fishing line is released, for instance, in casting the fishing rod. Brake force thereby varies due to action of centrifugal force not due to action of wedging force. In other words, brake force can be easily set.

(I) In the centrifugal brake mechanism 23, each of the plural brake shoes 64 is an elongated plate member including the semicircular contact surface 64*e* on its first end 64*a* for making contact with the brake drum 66.

In this case, the first end 64*a* of each brake shoe 64 has a semicircular shape. Therefore, the first end 64*a* easily keeps the same contact state with respect to the brake drum 66 when pivoting within a pivot range of each brake shoe 64.

(J) In the centrifugal brake mechanism 23, the contact surface 64*e* includes the protruding surface 64*f* and a pair of the slopes 64*g*. The protruding surface 64*f* is formed in the center part of the first end 64*a* in the thickness direction. The slopes 64*g* are tapered surfaces formed on the both lateral sides of the protruding surface 64*f*. Each slope 64*g* is slanted at the slant angle α steeper than the slant angle β of the tapered surface 66*b* for engaging with the tapered surface 66*b*.

In this case, the boundary between the protruding surface 64*f* and the slope 64*g* makes contact with the tapered surface 66*b* of the brake drum 66 as the contact part of each brake shoe 64. Therefore, the same contact part can make contact with the tapered surface 66*b*, and brake force can be thereby stabilized.

Other Exemplary Embodiments

An exemplary embodiment of the present invention has been described above. However, the present invention is not limited to the aforementioned exemplary embodiment, and a variety of changes can be herein made without departing from the scope of the present invention.

(a) In the aforementioned exemplary embodiment, six brake shoes 64 are disposed at predetermined intervals in the circumferential direction. However, the number of the brake shoes 64 can be arbitrarily set and can be at least one. When plural brake shoes 64 are provided, the number of the brake shoes 64 is not limited to six and can be arbitrarily set as long as the number of the brake shoes 64 is greater than or equal to two. It should be noted that the number of the brake shoes 64 is preferably set to be greater than or equal to three and less than or equal to eight for reducing size and weight of the reel and appropriately setting brake characteristics.

(b) In the aforementioned exemplary embodiment, the pivot axis PC of each brake shoe 64 is arranged downstream of the first end 64a in the rotational direction of the spool 12 in releasing the fishing line. The pivot axis PC can be disposed upstream of the first end 64a in the rotational direction of the spool 12 in releasing the fishing line.

(c) In the aforementioned exemplary embodiment, the rotation member 62 is coupled to the spool shaft 16 in a unitarily rotatable state. In the present invention, however, the structure of the rotation member 62 is not limited to the above. For example, the rotation member 62 can be coupled to the spool 12 in a unitarily rotatable state.

(d) In the aforementioned exemplary embodiment, the operating member 36 is a rotatable member. However, moving action of the operating member 36 is not limited to rotation, and can be arbitrarily set as long as the operation member 36 is movable. For example, the operating member can be a linearly-movable knob member, or alternatively, a pivotable lever member.

(e) In the aforementioned exemplary embodiment, the brake drum 66 is configured to be moved in the spool shaft direction. However, the rotation member 62 can be configured to be moved in the spool shaft direction. For example, the rotation member 62 can be herein configured to be locked in a moved position while being screwed onto the spool shaft 16 or screwed into the spool 12.

(f) Replacement of each brake shoe 64 is not particularly described in the aforementioned exemplary embodiment. However, plural types of brake shoes with different mass can be prepared for a replacement purpose. Brake force can be regulated in more various levels by replacing currently set brake shoe/shoes 64 with the brakes shoe/shoes of different type/types. Further, the number of the brakes shoes 64 can be reduced from six.

(g) In the aforementioned exemplary embodiment, the rotation member 62 is fixed onto the spool shaft 12 in a unitarily rotatable state. In the present invention, however, the rotational configuration of the rotation member 62 is not limited to the above. For example, the rotation member 62 can be configured to be rotated only in conjunction with rotation of either the spool 12 or the spool shaft 16 in the fishing-line releasing direction. In this case, a member such as a one-way clutch can be disposed between the rotation member 62 and either the spool 12 or the spool shaft 16.

Figure 12:
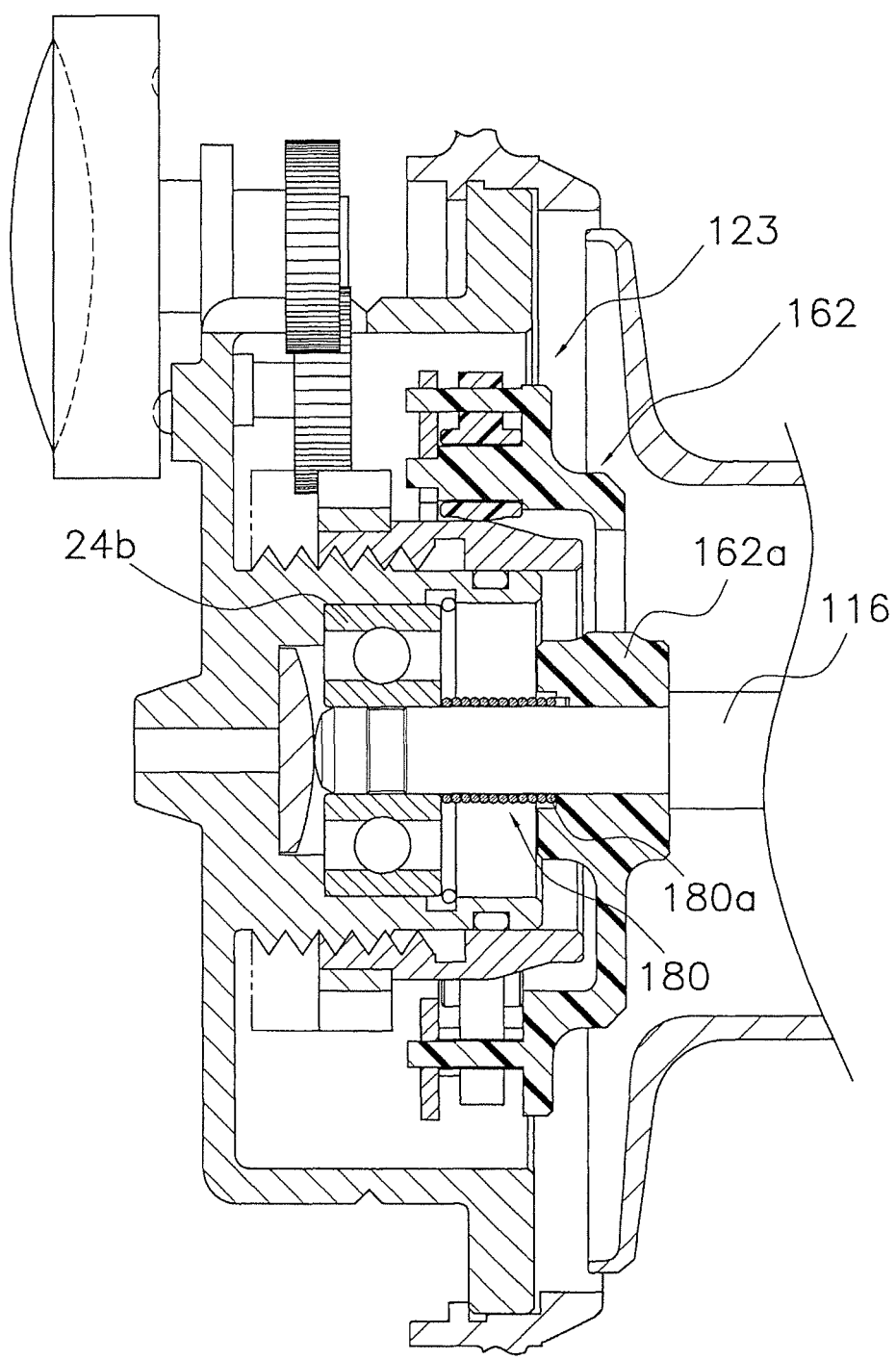
FIG. 12 is a diagram corresponding to FIG. 3 according to another exemplary embodiment.

In FIG. 12, a rotation member 162 of a centrifugal brake mechanism 123 is coupled to a spool shaft 116 through a one-way clutch 180 of a spring type. A boss 162a of the rotation member 162 is rotatably attached to the spool shaft 116. The one-way clutch 180 is formed by a coil spring 180a disposed in a compressed state. One end of the coil spring 180a is held by the boss 162a of the rotation member 162, while the other end thereof makes contact with the second bearing 24b.

In the one-way clutch 180 thus structured, the spring diameter of the coil spring 180a is reduced by friction with the spool shaft 116 when the spool shaft 116 is rotated in the fishing-line releasing direction. The coil spring 180a is herein rotated together with the spool shaft 116 and the rotation member 162 is thereby rotated in the fishing-line releasing direction. In contrast, the spring diameter of the coil spring 180a is increased when the spool shaft 116 is rotated in the fishing-line winding direction. Rotation of the spool shaft 116 is thereby prevented from being transmitted to the rotation member 162. It should be noted that the one-way clutch 180 is not limited to the form of the coil spring 180a and can be a claw-type one-way clutch or a roller-type one-way clutch.

The other components are the same as those in the aforementioned exemplary embodiment. Therefore, explanation thereof and assignment of reference numerals thereto in FIG. 12 will be hereinafter omitted.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least +5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A centrifugal brake device for a dual-bearing reel, the centrifugal brake device configured to brake a spool rotatably attached to a reel unit by centrifugal force, the centrifugal brake device comprising:
   a rotation member configured to be rotated at least in conjunction with rotation of the spool in a fishing-line releasing direction;
   a first brake shoe including a first end and a second end, the first brake shoe pivotably attached to the rotation member about an axis arranged in parallel to a rotation shaft of the spool, the axis arranged between the first end and a center of gravity of the first brake shoe; and
   a brake drum disposed inwards of the first brake shoe in a radial direction of the rotation member, the brake drum having different diameters and including an outer peripheral surface, the outer peripheral surface being configured to contact with the first end of the first brake shoe,
   the brake drum including a tapered surface on the outer peripheral surface thereof,
   a diameter of the tapered surface being reduced towards the spool.

2. The centrifugal brake device for a dual-bearing reel according to claim 1, further comprising:
   a moving mechanism configured to position and relatively move the first brake shoe and the brake drum in an axial direction of the rotation shaft.

3. The centrifugal brake device for a dual-bearing reel according to claim 2, wherein the moving mechanism includes an operating member movably attached to the reel unit in an outwardly exposed state, the moving mechanism configured to position the first brake shoe and the brake drum in different positions in accordance with a position of the operating member after being moved.

4. The centrifugal brake device for a dual-bearing reel according to claim 1, further comprising a second brake shoe being disposed away from the first brake shoe at a predetermined interval along a rotational direction of the spool.

5. The centrifugal brake device for a dual-bearing reel according to claim 4, further comprising:

a switching mechanism configured to switch at least one of the first and second brake shoes between an activated state for allowing contact with the brake drum and a non-activated state for preventing contact with the brake drum.

6. The centrifugal brake device for a dual-bearing reel according to claim 5, wherein the first brake shoe includes an inner surface connecting the first and second ends thereof, the inner surface is configured to be opposed to the brake drum, the inner surface is shaped for separating away from the outer peripheral surface of the brake drum when the first brake shoe is set to be in the non-activated state.

7. The centrifugal brake device for a dual-bearing reel according to claim 1, wherein the first brake shoe is supported by the rotation member for allowing the first end to be disposed upstream of the second end in the rotational direction of the spool when the spool is rotated in the fishing-line releasing direction.

8. The centrifugal brake device for a dual-bearing reel according to claim 1, wherein the first brake shoe is elongated plate member, the first brake shoe includes a semicircular contact surface on the first end for making contact with the brake drum.

9. The centrifugal brake device for a dual-bearing reel according to claim 8, wherein the contact surface includes a protruding surface formed in a center part of the first end in a thickness direction of the brake shoe and a pair of tapered slopes formed on both lateral sides of the protruding surface, each of the tapered slopes is slanted at an angle steeper than a slant angle of the tapered surface for engaging with the tapered surface.

\* \* \* \* \*